United States Patent
Wang (10) Patent No.: US 7,374,349 B2
(45) Date of Patent: May 20, 2008

(54) OPTICAL FIBER CONNECTOR

(75) Inventor: William H. Wang, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 287 days.

(21) Appl. No.: 10/938,194

(22) Filed: Sep. 10, 2004

(65) Prior Publication Data

US 2006/0056779 A1    Mar. 16, 2006

(51) Int. Cl.
*G02B 6/36* (2006.01)

(52) U.S. Cl. ............................. 385/92; 385/88; 385/53; 385/76; 385/77

(58) Field of Classification Search ................ 385/92, 385/86–88, 53, 76–77, 94
See application file for complete search history.

(56) References Cited

U.S. PATENT DOCUMENTS

| | | | |
|---|---|---|---|
| 4,678,264 A | 7/1987 | Bowen et al. | |
| 4,756,590 A | 7/1988 | Forrest et al. | |
| 6,033,125 A | 3/2000 | Stillie et al. | |
| 6,325,549 B1 * | 12/2001 | Shevchuk | 385/86 |

FOREIGN PATENT DOCUMENTS

| | | |
|---|---|---|
| DE | 4423711 C1 * | 1/1996 |
| EP | 0747740 A | 12/1996 |
| EP | 0869378 A1 | 10/1998 |
| EP | 1074869 A1 | 2/2001 |
| EP | 1111420 A | 6/2001 |
| JP | 04102809 | 4/1992 |
| JP | 2004212571 | 7/2004 |

OTHER PUBLICATIONS

PCT/US2005/030239, International Search Report and Written Opinion, Jan. 30, 2006.

* cited by examiner

*Primary Examiner*—Frank G. Font
*Assistant Examiner*—Michael P. Mooney
(74) *Attorney, Agent, or Firm*—Blakely, Sokoloff, Taylor & Zafman LLP (57) ABSTRACT

An optical fiber connector including a connector body, a connector case, and a latch spring. The connector body including an opening to receive an optical fiber, the opening having a first end and a second end, the optical fiber to enter the first end and to terminate proximate to the second end. The connector case is coupled to the connector body. The latch spring is coupled to the connector case.

11 Claims, 8 Drawing Sheets

OPTICAL FIBER CONNECTOR

BACKGROUND

1. Field

Embodiments of the invention relate to the field of optical systems and more specifically, but not exclusively, to an optical fiber connector.

2. Background Information

Many of today's electronic components are connected together by way of wire cables. Such cables include Universal Serial Bus (USB) cables, parallel printer cables, and Small Computer System Interface (SCSI) cables. Devices within a computer system are also connected using wired systems such as Integrated Drive Electronics (IDE) drive ribbon connectors. However, such electrical connections suffer from limitations in transmission speed and signal integrity.

Cables carrying optical signals on optical fiber are becoming more and more popular. Optical signals provide high-speed, superior signal quality, and minimal interference from outside electromagnetic energy. In today's systems, optical cables are often connected to components using glue or screw connectors.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
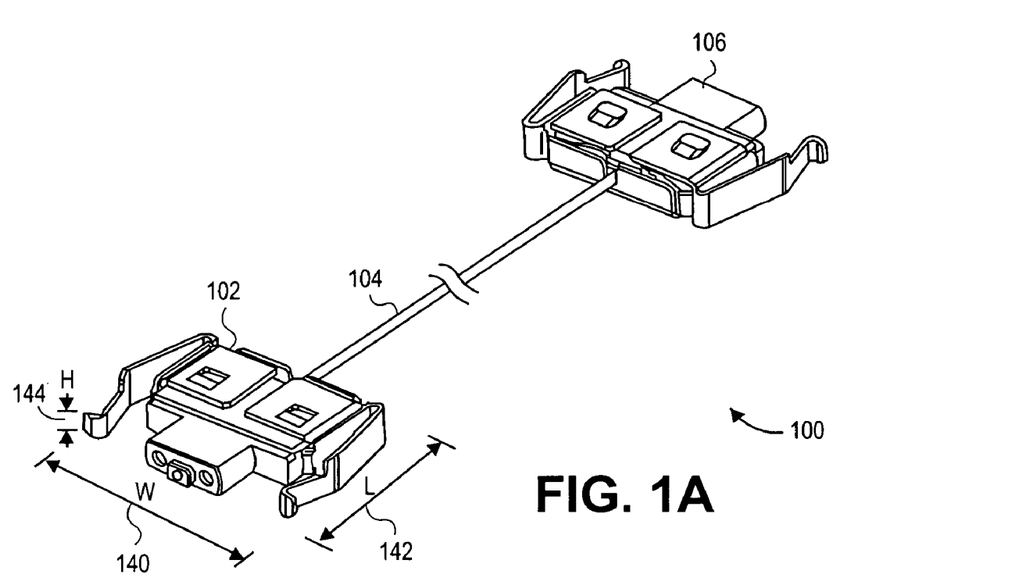
FIG. 1A is a diagram illustrating one embodiment of an optical fiber cable in accordance with the teachings of the present invention.

Referring to FIG. 1A, one embodiment of an optical fiber cable 100 is shown. Optical fiber cable 100 includes an optical fiber connector 102 coupled to one end of optical fiber 104 and an optical fiber connector 106 coupled to the other end of optical fiber 104.

In one embodiment, optical fiber 104 includes a plastic optical fiber, glass optical fiber, or the like. In one embodiment of plastic optical fiber, the core size of the plastic optical fiber may be, but is not limited to, 100 microns to 1000 microns. In another embodiment, a diameter of the plastic optical fiber may be 350 microns or 500 microns. In one embodiment, optical fiber 104 includes plastic optical fiber "Lucina" from the Asahi Glass Corporation.

Optical fiber connectors 102 and 106 may each be coupled to electro-optical (EO) components (not shown). The optical fiber cable 100 acts as a bridge to connect the EO components. In one embodiment, the distance between connectors 102 and 106 may be up to 300 meters. In one embodiment, optical fiber connector 102 may have a width (W) 140 of approximately 14 millimeters (mm), a length (L) 142 of approximately 9 mm, and a height (H) 144 (also known as a "profile") of approximately 2 mm. In one embodiment, the height 144 of connector 102 is 1.2 mm.

When in operation, an EO component may convert electrical signals into optical signals and transmit the optical signals to another EO component via optical fiber cable 100. The receiving EO component may then convert the optical signal into an electrical signal. It will be understood that optical signals may travel in either direction along optical fiber cable 100. In another embodiment, optical fiber cable 100 may be used to transmit optical signals having a wavelength of approximately 850 nanometers with a data rate of approximately 3-10 Gigabits per second. The use of optical fiber cable 100 with EO components will be discussed further below.

Figure 1B:
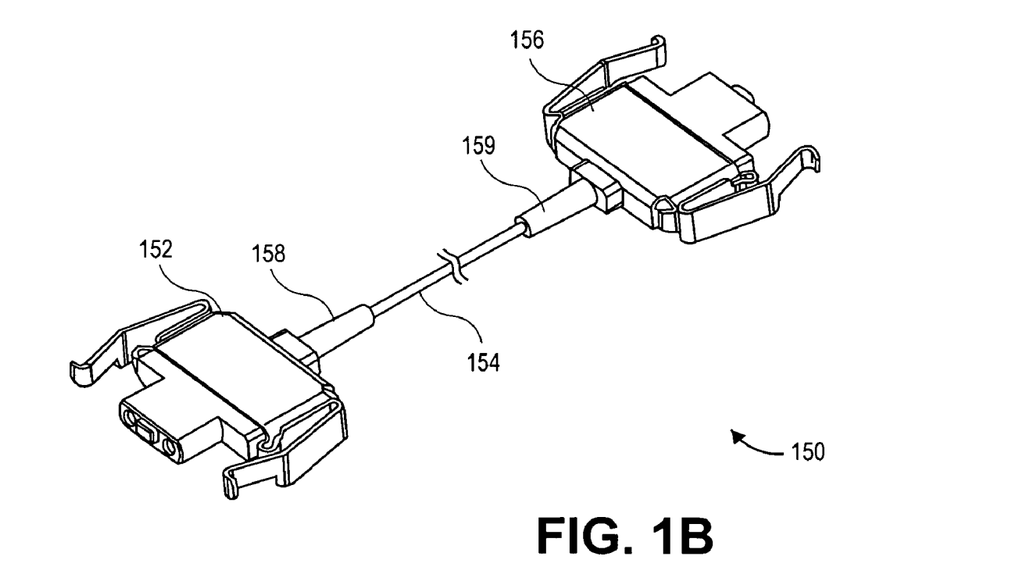
FIG. 1B is a diagram illustrating one embodiment of an optical fiber cable in accordance with the teachings of the present invention.

Referring to FIG. 1B, an embodiment of an optical fiber cable 150 is shown. Optical fiber cable 150 includes an optical fiber connector 152 coupled to one end of optical fiber 154 and an optical fiber connector 156 coupled to the other end of optical fiber 154.

Optical fiber connector 152 includes a strain relief 158 and optical fiber connector 156 includes a strain relief 159. Strain reliefs 158 and 159 alleviate stress on the connection between the optical fiber cable 154 and connectors 152 and 156. In one embodiment, strain reliefs 158 and 159 may be constructed from plastic, rubber, or other flexible material.

Figure 2A:
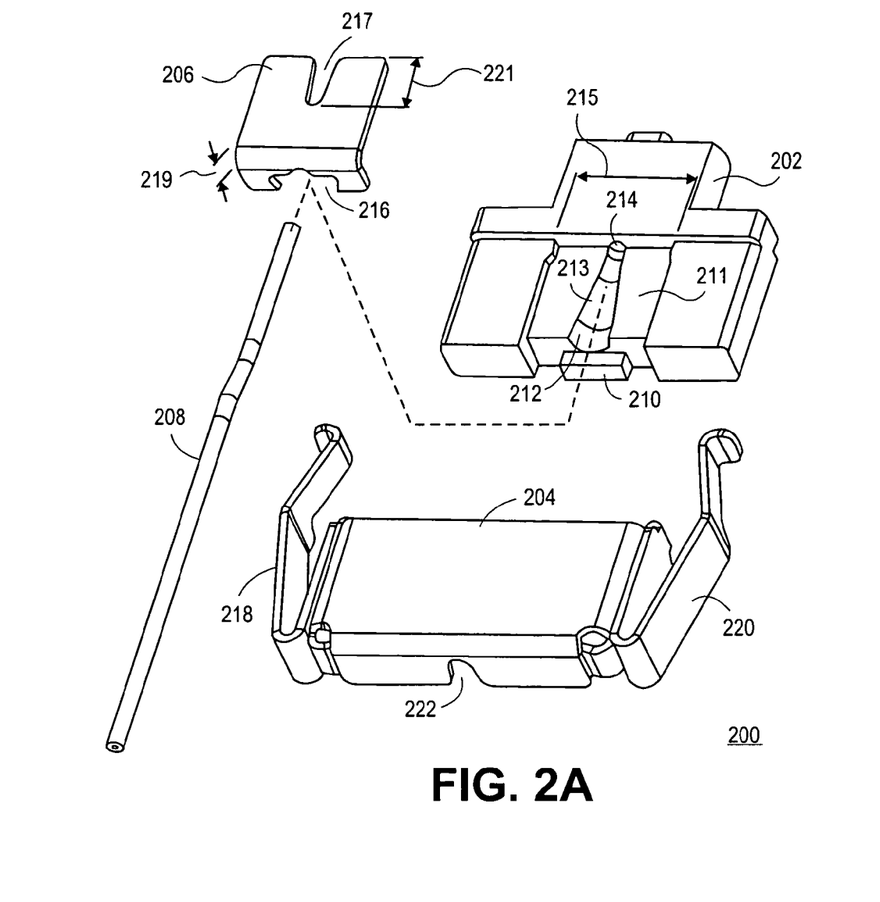
FIG. 2A is an exploded view diagram illustrating one embodiment of an optical fiber connector in accordance with the teachings of the present invention.
Figure 2B:
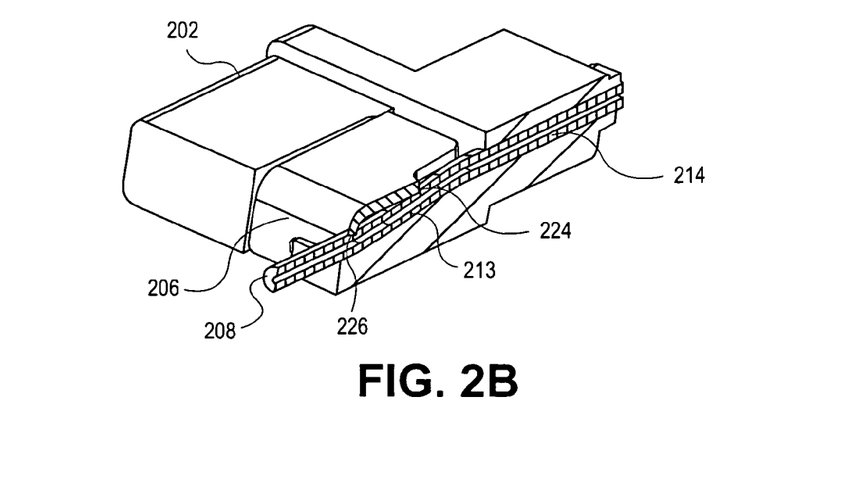
FIG. 2B is a cut-away perspective view diagram illustrating one embodiment of an optical fiber connector in accordance with the teachings of the present invention.
Figure 2C:
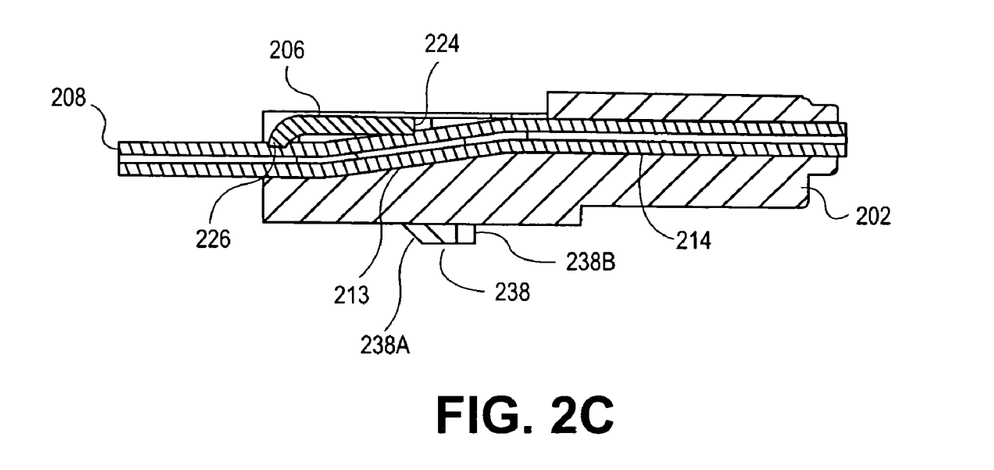
FIG. 2C is a cut-away side view diagram illustrating one embodiment of an optical fiber connector in accordance with the teachings of the present invention.
Figure 2D:
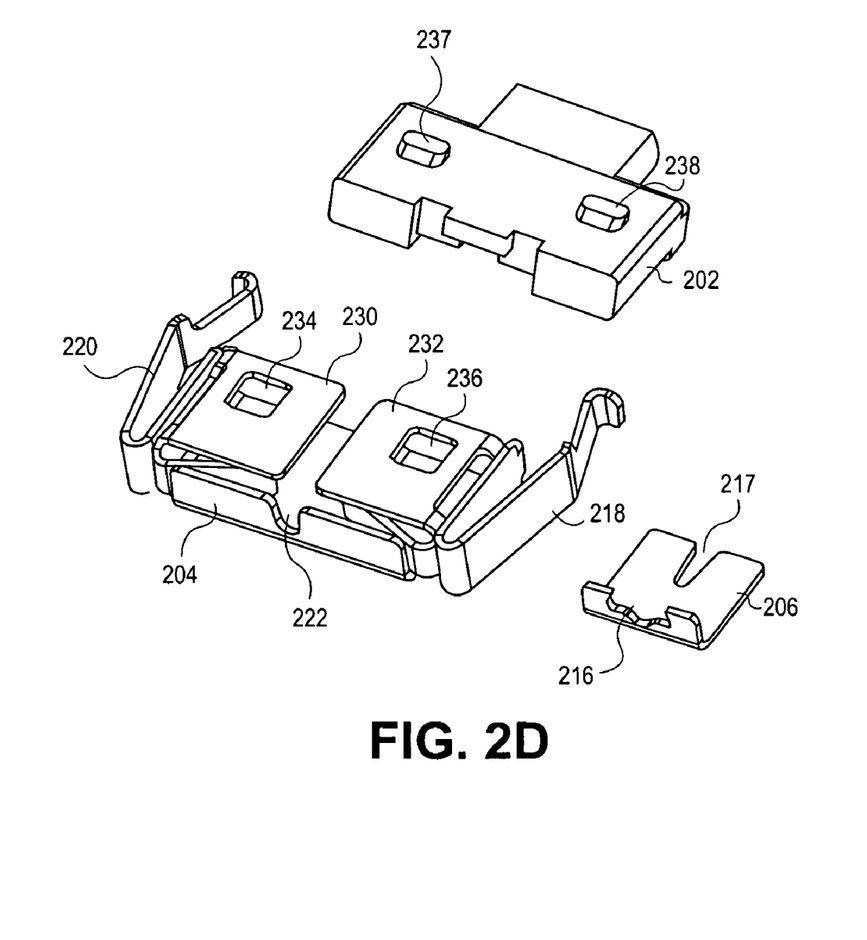
FIG. 2D is an exploded view diagram illustrating one embodiment of an optical fiber connector in accordance with the teachings of the present invention.

Turning to FIGS. 2A-2D, an embodiment of an optical fiber connector 200 is illustrated. FIG. 2A shows an exploded view of connector 200, FIG. 2B shows a cut-away perspective view of connector 200, FIG. 2C shows a cut-away side view of connector 200, and FIG. 2D shows an exploded view of connector 200. Optical fiber connector 200 includes a connector case 204 coupled to a connector body 202. Connector 200 also includes a fiber clip 206. As will be described in further detail below, an optical fiber 208 passes through an opening 212 in connector body 202. Fiber clip 206 is coupled to connector body 202 with optical fiber 208 passing between fiber clip 206 and connector body 202. Fiber clip 206 assists in securing the optical fiber into opening 212 of connector body 202. Connector case 204 is coupled over at least a portion of connector body 202. In FIGS. 2B and 2C, connector case 204 is not shown for clarity.

Connector body 202 includes opening 212 to receive optical fiber 208. Opening 212 includes a groove 213 and a tunnel 214. In one embodiment, groove 213 may be tapered with a gradually reducing diameter as groove 213 gets closer to tunnel 214. In one embodiment, the widest end of groove 213 may be 1.30 mm and the narrowest end of groove 213 where groove 213 meets tunnel 214 may be 0.52 mm. Tapered groove 213 may ease the assembly of connector 200 by simplifying the lineup of optical fiber 208 with opening 212.

In one embodiment, tunnel 214 may have a substantially constant diameter as it passes through connector body 202. In another embodiment, tunnel 214 may be tapered. In one embodiment, connector body 202 may be constructed substantially from plastic.

In one embodiment, connector body 202 may include a recess 211 for receiving fiber clip 206. Fiber clip 206 of FIGS. 2A-2D has generally an L-shape. In one embodiment, fiber clip 206 is constructed primarily from metal, such as stainless steel. In one embodiment, fiber clip 206 may be coupled to connector body 202 using a snap fit in recess 211. In this particular embodiment, the tightness of the snap fit may be controlled by a width 215 of some portion along recess 211. In another embodiment, fiber clip 206 couples to connector body 202 using glue, or the like.

In one embodiment, connector body 202 may include a protrusion 210 for receiving fiber clip 206. In this embodiment, fiber clip 206 may include a notch 216 that fits over protrusion 210. Notch 216 may be sized to produce a snap fit with protrusion 210. Fiber clip 206 may also include a cutout 217. Cutout 217 allows optical fiber 208 to pass by fiber clip 206 when assembled with connector body 202.

As shown in FIGS. 2B and 2C, when assembled, fiber clip 206 engages optical fiber 208 at two clamping points 224 and 226. In one embodiment using plastic optical fiber, fiber clip 206 may dig into the outside material of optical fiber 208 to provide better retention of optical fiber 208 in connector 200. In yet another embodiment, the clamping force of fiber clip 206 is controlled by a height 219 and a length 221 of cutout 217. In FIG. 2A, height 219 is between a top surface of fiber clip 206 and notch 216.

Referring to FIGS. 2B and 2C, the tapered shape of groove 213 produces a curve in optical fiber 208 as optical fiber 208 passes through connector 200. In one embodiment, the combination of the fiber clip 206 and the curve of optical fiber 208 create a wedge-effect for securing optical fiber 208 in connector 200.

In one embodiment, connector case 204 may include latch springs 218 and 220. In the embodiment of connector 200, the latch springs 218 and 220 are positioned on opposite sides of connector case 200. In another embodiment, latch springs 218 and 220 are constructed from metal. Latch springs 218 and 220 may be used to secure connector 200 to an EO component (discussed further below). In one embodiment, latch springs 218 and 220 are coupled to connector case 204 via a snap fit, glue, screws, or the like.

Connector case 204 may include a notch 222 to allow optical fiber 208 to pass through connector case 204. Connector case 204 may be constructed from plastic, metal, or any combination thereof. In one embodiment, a strain relief (not shown) may be coupled to case 204 at notch 222 such that optical fiber 208 passes through the strain relief.

FIG. 2D shows a tab 230 and a tab 232 of connector case 204. In one embodiment, tab 230 includes a cutout 234 and tab 232 includes a cutout 236. In one embodiment, tabs 230 and 232 are formed during the fabrication of connector case 204 such that tabs 230 and 232 are part of connector case 204. Cutout 234 may fit over corresponding post 237 on connector body 202 and cutout 236 may fit over corresponding post 238 on connector body 202 for coupling connector case 204 to connector body 206.

In one embodiment, posts 237 and 238 have a ramp surface facing connector case 204 for ease of assembly. In the embodiment of FIG. 2C, post 238 has a ramped side 238A and an unramped side 238B. As shown in FIG. 2C, unramped side 238B is perpendicular to a surface of connector body 202. In coupling connector case 204 to connector body 202, tab 232 may slide up ramped side 238A. Post 238 fits into cutout 236 so tab 232 may fit around post 238. Once tab 232 is fitted around post 238, connector case 204 may not be pulled off of connector body 202 because of unramped side 238B.

In one embodiment, the width of material connecting the tabs 230 and 232 to their corresponding perpendicular side walls of connector case 204 affects the flexibility of tabs 230 and 232. The flexibility of tabs 230 and 232 may be adjusted to modify the fit of connector case 204 over connector body 202 and fiber clip 206.

Figure 3A:
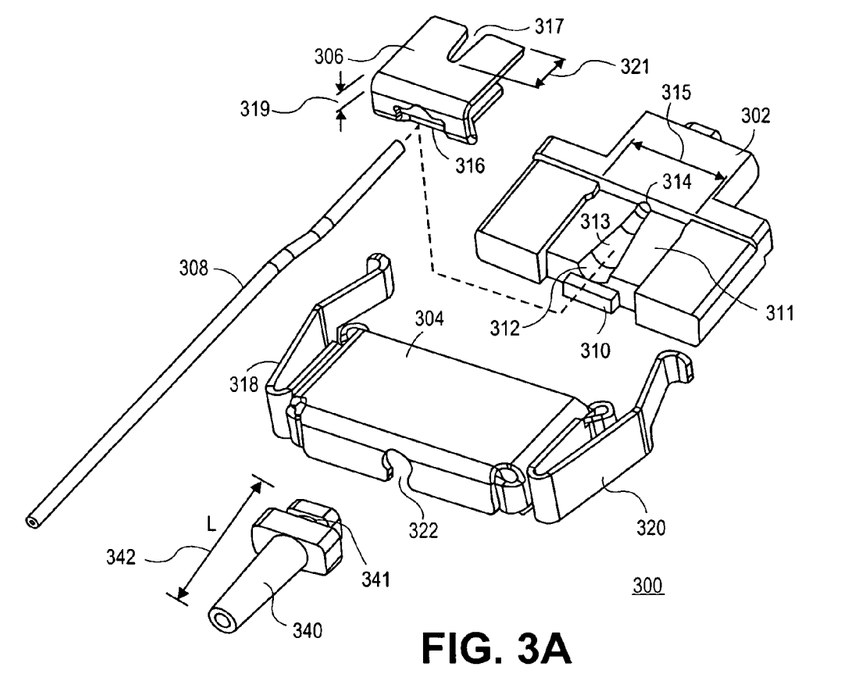
FIG. 3A is an exploded view diagram illustrating one embodiment of an optical fiber connector in accordance with the teachings of the present invention.
Figure 3B:
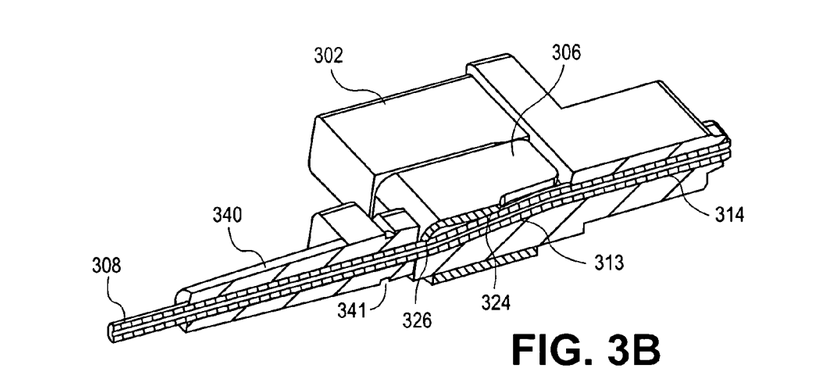
FIG. 3B is a cut-away perspective view diagram illustrating one embodiment of an optical fiber connector in accordance with the teachings of the present invention.
Figure 3C:
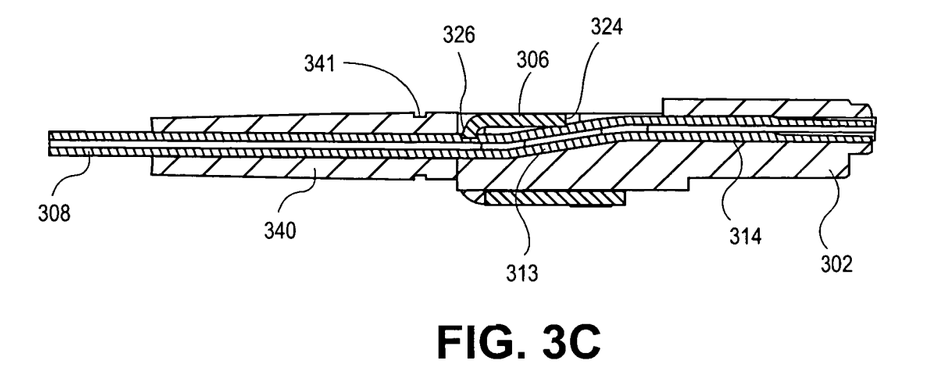
FIG. 3C is a cut-away side view diagram illustrating one embodiment of an optical fiber connector in accordance with the teachings of the present invention.
Figure 3D:
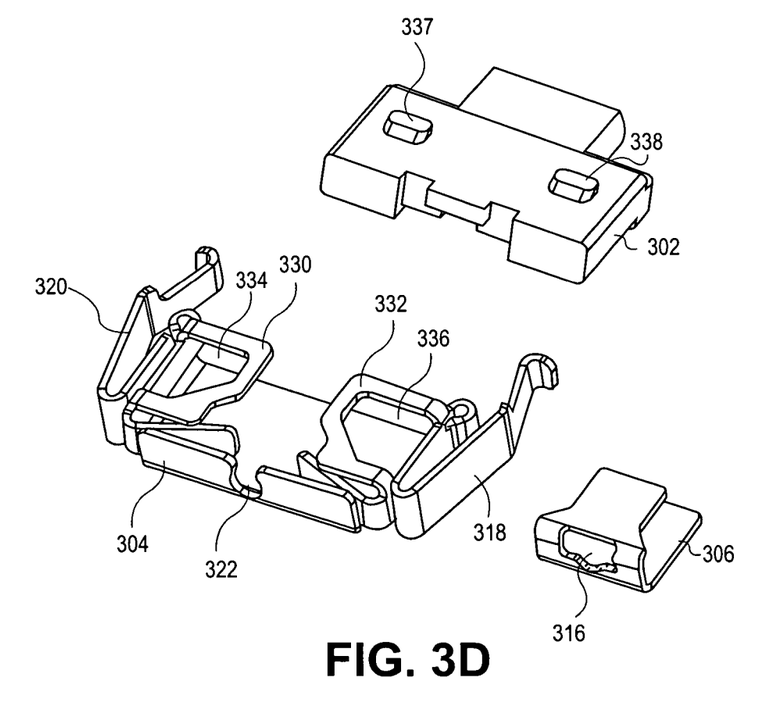
FIG. 3D is an exploded view diagram illustrating one embodiment of an optical fiber connector in accordance with the teachings of the present invention.

Referring to FIGS. 3A-3D, an embodiment of an optical fiber connector 300 is shown. FIG. 3A shows an exploded view of connector 300, FIG. 3B shows a cut-away perspective view of connector 300, FIG. 3C shows a cut-away side view of connector 300, and FIG. 3D shows an exploded view of connector 300. Optical fiber connector 300 includes a connector body 302, a connector case 304, a fiber clip 306, and a strain relief 340. Optical fiber connector 300 enables the coupling of optical fiber 308 to an EO component. In FIGS. 3B and 3C, connector case 304 is not shown for clarity.

Connector body 302 includes an opening 312. Opening 312 includes a groove 313 and a tunnel 314. In one embodiment, groove 313 tapers to a smaller diameter as the optical fiber 308 enters the connector 302 and terminates at the end of tunnel 314. In another embodiment, connector body 302 includes a protrusion 310 to assist in securing fiber clip 306 using a notch 316.

In one embodiment, connector body 302 may include a recess 311 for receiving fiber clip 306. In one embodiment, fiber clip 306 may be coupled to connector body 302 using a snap fit in recess 311 by controlling the width 315 at some portion of recess 311; in another embodiment, fiber clip 306 couples to connector body 302 using glue, or the like.

Fiber clip 306 may have a U-shape, as shown in FIGS. 3A and 3D. Fiber clip 306 may also include a cutout 317. Cutout 317 allows optical fiber 308 to pass by fiber clip 306 when assembled with connector body 302.

Connector case 304 may include latch springs 318 and 320. Latch springs 318 and 320 may used to secure connector 300 to an EO component (discussed further below). Connector case 304 may include a notch 322 to allow optical fiber 308 to pass through connector case 304.

As shown in FIGS. 3B and 3C, when assembled, fiber clip 306 engages optical fiber 308 at two clamping points 324 and 326. In one embodiment using plastic optical fiber, fiber clip 306 may dig into the outside material of optical fiber 308 to provide better retention of optical fiber 308 in connector 300. In yet another embodiment, the clamping force of fiber clip 306 may be controlled by a height 319 between a top surface of fiber clip 306 and notch 316, and a length 321 of cutout 317.

Referring to the embodiments of FIGS. 3B and 3C, the tapered shape of groove 313 produces a curve in optical fiber 308 as optical fiber 308 passes through connector 300. In one embodiment, the combination of the fiber clip 306 and the curve of optical fiber 308 create a wedge-effect for securing optical fiber 308 in connector 300.

In embodiment, strain relief 340 relieves the strain put on optical fiber 308 as optical fiber 308 enters optical fiber connector 300. If optical fiber 308 is bent at a sharp angle in relation to optical fiber connector 300, strain relief 340 prevents damage to optical fiber 308 from bending at notch 322. Strain relief 340 may be constructed from rubber, plastic, or other appropriate flexible material.

In one embodiment, strain relief 340 may include a recess 341. Notch 322 may fit around recess 341 to hold strain relief 340. A portion of strain relief 340 may be inside connector case 304, while the rest of strain relief 340 may be outside of connector case 304. In one embodiment, a length (L) 342 of strain relief 340 may be approximately 6 mm.

FIG. 3D shows a tab 330 and a tab 332 of connector case 304. In one embodiment, tabs 330 and 332 are an integrated part of connector case 304 formed from the same material as connector case 304. In one embodiment, tab 330 includes a cutout 334 and tab 332 includes a cutout 336. Cutout 334 may fit over corresponding post 337 on connector body 302 and cutout 336 may fit over corresponding post 338 on connector body 302 for coupling connector case 304 to connector body 306. In one embodiment, posts 337 and 338 may have a ramp surface facing connector case 304 for ease of assembly of connector case 304 over connector base 302.

In one embodiment, the width of material connecting the tabs 330 and 332 to their corresponding perpendicular side walls of connector case 304 affects the flexibility of tabs 330 and 332. In one embodiment, cutouts 334 and 336 are enlarged and extended to the corresponding perpendicular side walls of connector case 304, as shown in FIG. 3D, to make tabs 330 and 332 more flexible. The flexibility of tabs 330 and 332 may affect the fit of connector 300 when coupling connector case 304 over connector body 302 and fiber clip 306.

Figure 4:
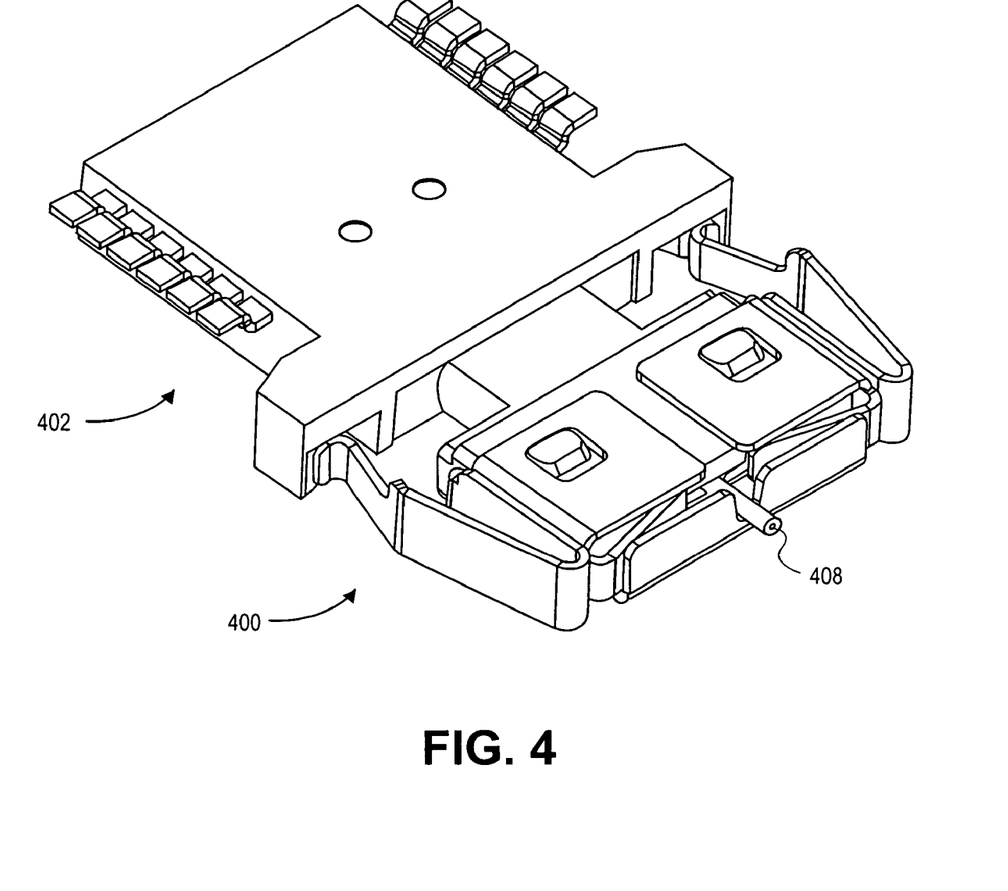
FIG. 4 is a diagram illustrating one embodiment of an optical fiber connector in accordance with the teachings of the present invention.

FIG. 4 illustrates an optical fiber connector 400 to be coupled to an EO component 402. Connector 400 provides optical fiber 408 with a positive fiber/lens engagement with a lens (not shown) of EO component 402. Optical fiber connector 400 may be positioned and/or pushed to engage EO component 402 by human hands, human hands using tools, or by a mechanical device. In one embodiment, screws or glue are not needed to couple connector 400 to EO component 402. In another embodiment, the height of connector 400 is less than 2 mm. This low profile allows optical fiber connector 400 to be used in tight spaces such as inside a notebook computer or other thin devices.

Figure 5A:
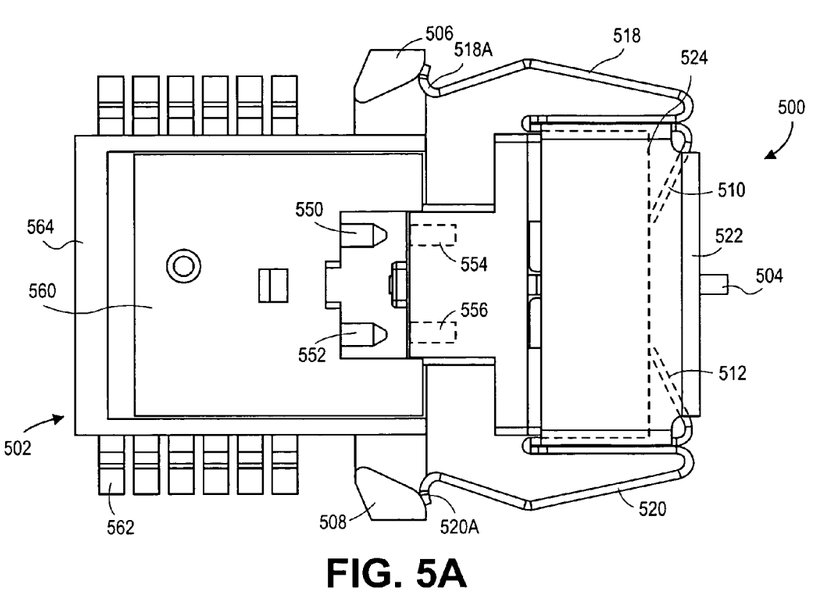
FIG. 5A is a diagram illustrating one embodiment of an optical fiber connector in accordance with the teachings of the present invention.
Figure 5B:
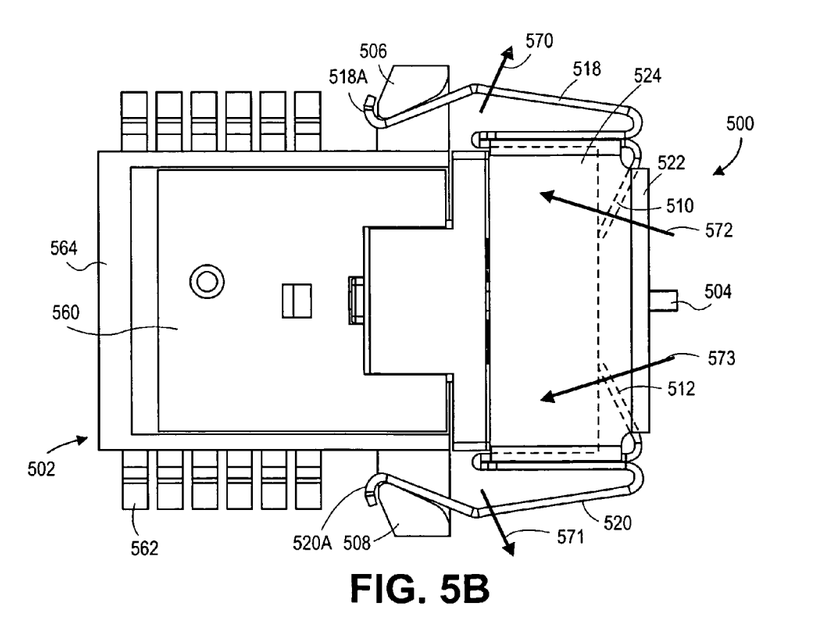
FIG. 5B is a diagram illustrating one embodiment of an optical fiber connector in accordance with the teachings of the present invention.

FIGS. 5A and 5B illustrate the coupling of an optical fiber connector 500 with an EO component 502. In FIG. 5A, connector 500 is about to be latched to EO component 502. Connector 500 includes latch springs 518 and 520. Connector 500 also includes preload springs 510 and 512. In the embodiment of FIGS. 5A and 5B, the latch springs 518, 520 and preload springs 510, 512 are formed from the same piece of metal manufactured to the illustrated shape. The latch springs 518, 520 and preload springs 510, 512 are coupled to opposing sides of a connector case 522. It will be understood that in other embodiments the latch springs and the preload springs maybe be separate pieces. It will also be understood that latch springs 518, 520 and preload springs 510, 512 may be placed in different positions of connector 500.

EO component 502 may include leads 562 coupled to a frame 564. In one embodiment, leads 562 may include a conductive material, such as a metal. In the embodiment of FIGS. 5A and 5B, leads 562 include gull wing surface mount technology (SMT) leads. In another embodiment, frame 546 may be constructed from molded plastic.

EO component 502 may include a lens 560. In one embodiment, EO component 502 may include a Vertical Cavity Surface Emitting Laser (VCSEL) for transmitting an optical signal carried by optical fiber 504. In another embodiment, EO component 502 may include a Photo Intrinsic Diode (PIN) for receiving an optical signal carried by optical fiber 504.

EO component 502 may include latch posts 506 and 508. Latch springs 518, 520 are positioned to engage corresponding latch posts 506, 508. In one embodiment, latch posts 506, 508 are integrated into the plastic of frame 564.

EO component 502 may include guiding rods 550 and 552. The guiding rods 550, 552 correspond to guiding rod holes 554 and 556 in connector body 524 to assist in alignment of the connector body 524 with EO component 502.

In one embodiment, to couple optical fiber connector 500 to EO component 502, the optical fiber connector 500 is pushed towards the EO component 502. As optical fiber connector 500 is pushed, latch springs 518, 520 are pushed against corresponding latch posts 506, 508. In one embodiment, latch spring 518 includes a hook end 518A and latch spring 520 includes a hook end 520A. This pushing may result in latch springs 518, 520 being depressed toward connector body 524. The depression of latch springs 518, 520 allows hook ends 518A, 520A to pass by latch posts 506, 508.

FIG. 5B shows connector 500 coupled to EO component 502. Hook ends 518A and 520A have wrapped around latch posts 506 and 508, respectively. Latch spring 518 exerts a spring force 570 to push latch spring 518 away from connector body 524 and against latch post 506. Latch spring 520 exerts a spring force 571 to push latch spring 520 away from connector body 524 and against latch post 508. Spring forces 570, 571 assist the latch springs 518, 520 to remain engaged with EO component 502.

Preload spring 510 exerts a spring force 572 and preload spring 512 exerts a spring force 573. Preload springs 510, 512 push against connector body 524. The hook ends 518A and 520A engaged with posts 506 and 508, respectively, prevent the preload springs 510 and 512 from pulling the connector case 522 off connector body 524. In this embodiment, latch springs 518, 520 and preload springs 510, 512 together push the connector body 524 against EO component 502 to ensure positive contact with EO component 502. Positive contact eliminates gaps between connector body 524 and lens 560.

In one embodiment, connector body 524 may include posts (not shown in FIG. 5) similar to posts 237 and 238. These posts prevent connector body 524 from being pushed out off connector case 522 by preload springs 510, 512. These posts may also be ramped, as described in connection with posts 237 and 238. The ramping allows connector case 522 to slide over connector body 524. The unramped sides of posts stop connector case 522 from being pushed off of connector body 524 by preload springs 510 and 512.

Figure 6A:
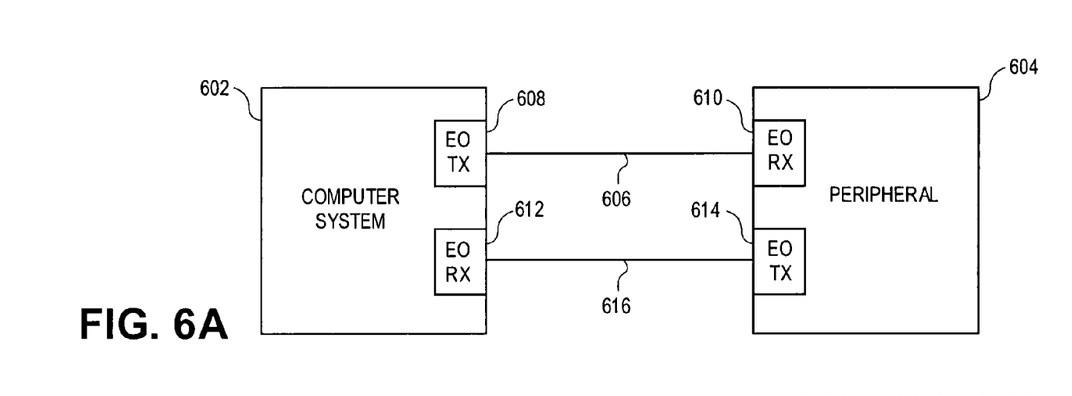
FIG. 6A is a block diagram illustrating one embodiment of an optical fiber cable connected to electro-optical components in accordance with the teachings of the present invention.

Referring to FIG. 6A, a computer system 602 coupled to a peripheral 604 via optical fiber cables 606 and 616 is illustrated. In one embodiment computer system 602 includes a processor for executing instructions stored in computer system 602 or received over a communication link. Embodiments of computer system 602 include, but are not limited to, a desktop computer, a notebook computer, a server, a personal digital assistant, a network workstation, or the like. Computer system 602 may also include other electronic devices such as a digital camera, a Compact Disc (CD) player, a Moving Pictures Experts Group Layer-3 (MP3) player, a Digital Video Disc (DVD) player, or the like. Peripheral 604 may include a display, a keyboard, a mouse, a printer, a fax machine, a scanner, a speaker system, or the like. Peripheral 604 may also include a storage device, such as a disk drive, a tape drive, or the like.

Computer system 602 includes an EO transmitter (EO TX) 608 and an EO receiver (EO RX) 612. Peripheral 604 includes an EO RX 610 and an EO TX 614. In other embodiments, EO TX 608, EO RX 612 and EO TX 614, EO RX 610 may be implemented as transceivers such that computer system 602 and peripheral 604 communicate over a single optical fiber cable.

Figure 6B:
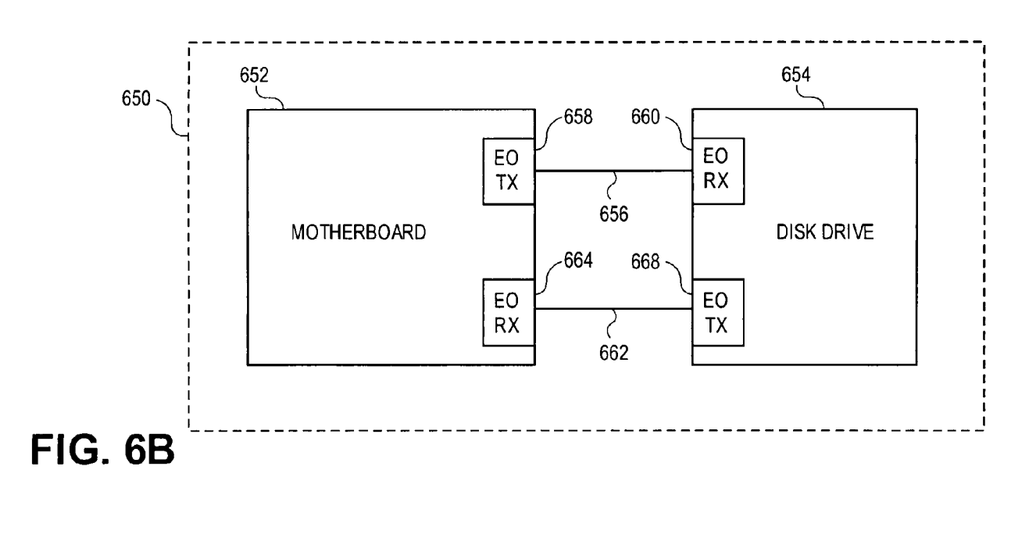
FIG. 6B is a block diagram illustrating one embodiment of an optical fiber cable connected to electro-optical components in accordance with the teachings of the present invention.

FIG. 6B shows a computer system 650 including a motherboard 652 coupled to a disk drive 654 using optical fiber cables 656 and 662. Disk drive 654 may include a magnetic disk drive and an optical disk drive. It will be understood that in other embodiments of computer system 650, other components may be coupled to motherboard 652 using optical fiber cables as described herein. In yet another embodiment, optical fiber cables as described herein may couple components within a computer system, such as components within a DVD player.

Motherboard 652 may include an EO TX 658 communicatively coupled to an EO RX 660 of disk drive 654 via optical fiber cable 656. Motherboard 652 may also include an EO RX 664 communicatively coupled to EO TX 668 via optical fiber cable 662. In one embodiment, motherboard 652 and disk drive 654 may communicate at data rates above 3 Gigabits per second.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description.

The terms used in the following claims should not be construed to limit the invention to the specific embodiments disclosed in the specification. Rather, the following claims are to be construed in accordance with established doctrines of claim interpretation.

What is claimed is:

1. An apparatus, comprising:
    a connector body including an opening to receive an optical fiber, the opening having a first end and a second end, the optical fiber to enter the first end and to terminate proximate to the second end;
    a connector case coupled to the connector body;
    a latch spring coupled to the connector case; and
    a removable fiber clip coupled to the connector body and positioned between the connector body and the connector case, the optical fiber to pass between the connector body and the fiber clip such that the fiber clip engages the optical fiber at two clamping points.

2. An optical fiber connector, comprising:
    a connector body including an opening to hold a plastic optical fiber, the opening having a first end and a second end, an end of the plastic optical fiber proximate to the second end of the opening;
    a fiber clip coupled to the connector body using a press fit, the fiber clip to engage the plastic optical fiber at two clamping points on the plastic optical fiber;
    a connector case coupled to the connector body, the connector case to fit over the connector body; and
    a first and a second latch spring coupled to the connector case, the first and second latch springs positioned on opposite sides of the connector case, wherein the first latch spring includes a first preload spring and the second latch spring includes a second preload spring, the first and second preload springs to push against the connector body.

3. The optical fiber connector of claim 2 wherein the first latch spring includes a first hook end and the second latch spring includes a second book end.

4. The optical fiber connector of claim 2, further comprising a strain relief coupled to the connector case, the plastic optical fiber to pass through a passage within the strain relief.

5. The optical fiber connector of claim 2 wherein the opening comprises;
    a groove proximate to the first end of the opening, a first groove end nearest the first end of the opening having a larger diameter than a second groove end proximate to the second end of the opening; and
    a tunnel through the connector body proximate to the second end of the opening.

6. The optical fiber connector of claim 2 wherein the connector body includes a guiding rod hole proximate to the second end of the opening.

7. An optical fiber cable, comprising:
    a plastic optical fiber including a first end and a second end;
    a first optical fiber connector coupled to the first end, wherein the first optical fiber connector includes:
        a connector body including an opening to receive the plastic optical fiber, the opening including a first opening end and a second opening end, the first end of the plastic optical fiber to terminate proximate to the second opening end;

a fiber clip coupled to the connector body using a press fit, the fiber clip to engage the plastic optical fiber at two clamping points on the plastic optical fiber to secure the plastic optical fiber into the opening;

a connector case coupled to the connector body, the connector case to fit over the connector body to cover the fiber clip;

a first latch spring and a second latch spring coupled to the connector case, the first and second latch springs positioned on opposite sides of the connector case, wherein the first latch spring includes a first preload spring and the second latch spring includes a second preload spring, the first and second preload springs to push against the connector body; and a second optical fiber connector coupled to the second end of the plastic optical fiber.

8. The optical fiber cable of claim 7 wherein the connector body includes a first post and a second post, wherein the connector case includes a first tab and a second tab, the first and second posts to engage the first and second tabs, respectively, to prevent the first and second preload springs from pushing the connector case off of the connector body.

9. An apparatus, comprising:
a connector body including an opening to receive an optical fiber, the opening including a first end and a second end, the optical fiber to enter the first end and to terminate proximate to the second end;
a connector case coupled to the connector body;
means for securing the optical fiber to the connector body, the means located between the connector case and the connector body and including a tapered groove in the opening to form a curve in the optical fiber; and
means for coupling the connector case to an electro-optical component.

10. The apparatus of claim 9 wherein the optical fiber includes a plastic optical fiber.

11. A system, comprising:
a first electro-optical component;
a disk drive including a second electro-optical component; and
an optical fiber cable coupled to the first electro-optical component and to the second electro-optical component, the optical fiber cable comprising:
a first optical fiber connector coupled to a first end of an optical fiber, the first optical fiber connector comprising:
a connector body including an opening to receive the plastic optical fiber, the opening including a first opening end and a second opening end, the plastic optical fiber to enter the first opening end and to terminate proximate to the second opening end, and a tapered groove, the tapered groove and the fiber clip to create a wedge-effect to secure the plastic optical fiber to the first optical fiber connector;
a removable fiber clip coupled to the connector body using a press fit, the fiber clip to engage the plastic optical fiber at two clamping points on the plastic optical fiber to secure the plastic optical fiber into the opening; and
a connector case coupled to the connector body, the connector case to fit over the connector body, the fiber clip positioned between the connector body and the connector case; and
a second optical fiber connector coupled to a second end of the optical fiber.

\* \* \* \* \*